United States Patent [19]

Schroeder et al.

[11] Patent Number: 6,030,675
[45] Date of Patent: Feb. 29, 2000

[54] TISSUE CONTAINING SILICONE AMIDOAMINE ESTERS AND PHOSPHATES

[75] Inventors: Wen Zyo Schroeder; Gary Lee Shanklin, both of Appleton, Wis.

[73] Assignee: Kimberly-Clark Worldwide, Inc., Neenah, Wis.

[21] Appl. No.: 09/107,429

[22] Filed: Jun. 30, 1998

Related U.S. Application Data

[63] Continuation-in-part of application No. 08/738,199, Oct. 25, 1996, abandoned.

[51] Int. Cl.⁷ .................................................. B32B 3/00
[52] U.S. Cl. ........................... 428/59; 428/447; 428/452; 428/409; 428/221; 162/127; 162/164.4; 162/164.6; 162/135
[58] Field of Search ................. 162/127, 164.4, 162/164.6, 135; 428/59, 447, 452, 409, 221

[56] References Cited

U.S. PATENT DOCUMENTS

| 5,093,452 | 3/1992 | O'Lenick, Jr. ............................ 528/25 |
| 5,098,979 | 3/1992 | O'Lenick, Jr. ............................ 528/15 |
| 5,164,046 | 11/1992 | Ampulski et al. ...................... 162/111 |
| 5,166,297 | 11/1992 | O'Lenick, Jr. ............................ 528/26 |
| 5,354,425 | 10/1994 | Mackey et al. ......................... 162/135 |
| 5,552,020 | 9/1996 | Smith et al. .......................... 162/164.4 |
| 5,591,306 | 1/1997 | Kaun ........................................ 162/127 |
| 5,707,435 | 1/1998 | Halloran ............................. 106/287.11 |
| 5,904,810 | 5/1999 | Schroeder et al. ...................... 162/111 |

FOREIGN PATENT DOCUMENTS

| 0 688 901 A3 | 12/1995 | European Pat. Off. ........ D21H 21/22 |
| WO 96/05372 A1 | 2/1996 | WIPO ............................. D21H 17/59 |
| WO 96/08601 A1 | 3/1996 | WIPO ............................. D21H 19/32 |
| WO 97/04170 A1 | 2/1997 | WIPO ............................. D21H 21/22 |

*Primary Examiner*—Margaret G. Moore
*Attorney, Agent, or Firm*—Gregory E. Croft

[57] ABSTRACT

The invention relates to tissue products having improved softness properties and methods of making them. Specifically, improved softness is achieved by incorporating a cationic silicone amidoamine ester or phosphate and, optionally, one or more softeners/debonders into the fiber furnish at the wet end of the tissue machine prior to formation, followed by an optional topical treatment with a cationic silicone amidoamine ester or phosphate and/or one or more softeners/debonders after the tissue web is formed. The result is a tissue product with added bulk and a smooth surface feel, both properties contributing to improved softness characteristics.

13 Claims, No Drawings

TISSUE CONTAINING SILICONE AMIDOAMINE ESTERS AND PHOSPHATES

This application is a continuation-in-part of application Ser. No. 08/738,199 entitled TISSUE CONTAINING SILICONE QUATERNARIES and filed in the U.S. Patent and Trademark Office on Oct. 25, 1996. The entirety of application Ser. No. 08/738,199 is hereby incorporated by reference. Ser. No. 08/738,199 is now abandoned.

BACKGROUND OF THE INVENTION

Improving the softness of tissues is a continuing objective in tissue manufacture. In general, prior efforts have been directed at reducing the inter-fiber bonding within the tissue structure or coating the tissue surface with chemicals which improve the surface feel. Softness, however, is a perceived property of tissues comprising many factors including bulk softness and surface smoothness. To date, efforts have tended to focus on one or the other. Hence, there is a need for a method which improves both bulk softness and surface smoothness.

SUMMARY OF THE INVENTION

It has now been discovered that the softness of tissues can be improved by the addition of a silicone amidoamine ester or phosphate(hereinafter defined) either to the tissue-making furnish at the wet end of the tissue machine and/or to the formed web by topical addition. Optionally, one or more softener/debonders (hereinafter defined) can be added to the tissue making furnish and/or to the surface of the web.

Hence in one aspect, the invention resides in a method for making soft tissue comprising: (a) forming an aqueous suspension of papermaking fibers containing silicone amidoamine ester or phosphate, with or without one or more softener/debonders; (b) forming a tissue web by depositing the aqueous suspension of papermaking fibers onto a forming fabric; and (c) dewatering and drying the web.

In another aspect, the invention resides in a method for making soft tissue comprising: (a) forming an aqueous suspension of papermaking fibers; (b) forming a tissue web by depositing the aqueous suspension of papermaking fibers onto a forming fabric; (c) dewatering and drying the web; and (d) topically applying a silicone amidoamine ester or phosphate to the web.

In another aspect, the invention resides in a method for making soft tissue comprising (a) forming an aqueous suspension of papermaking fibers containing a silicone amidoamine ester or phosphate; (b) forming a tissue web by depositing the aqueous suspension of papermaking fibers onto a forming fabric; (c) dewatering and drying the web; and (d) topically applying a silicone amidoamine ester or phosphate to the web.

In all of the foregoing aspects, the amount of the silicone amidoamine ester or phosphate in the aqueous suspension or added to the web can be from about 0.01 to about 10 weight percent, based on dry fiber, more specifically from about 0.1 percent to about 3 percent. In addition, one or more softener/debonders can be optionally added, either to the aqueous suspension of papermaking fibers or by topical addition to the wet or dry web. The softener/debonder applied to the web can be the same softener/debonder added to the furnish, or it can be different, if a softener/debonder is introduced at both locations.

In a further aspect, the invention resides in a soft tissue containing from about 0.01 to about 10 weight percent, based on dry fiber, more specifically from about 0.1 percent to about 3 percent, of a silicone amidoamine ester or phosphate. Optionally the tissue can further contain from about 0.1 to about 3 weight percent, based on dry fiber, of one or more softener/debonders described below.

As used herein, a silicone amidoamine ester or phosphate is a compound having the following structural formulas:

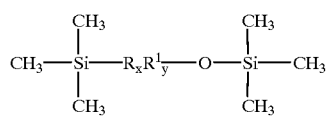

wherein
x=1–1000;
y=0–1000;

$R^1$ has the following structure:

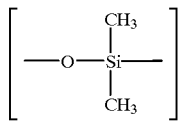

and R has the following ester structure:

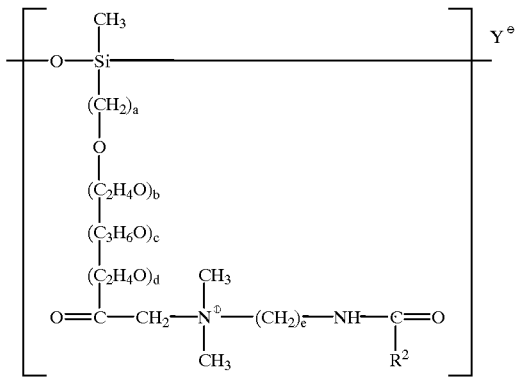

where
Y=halide, methyl sulfate, ethyl sulfate or other compatible counterion;
$R^2$ is selected from aliphatic group, $C_8$–$C_{24}$, normal or branched, saturated or unsaturated;
a, e=1–4;
b, c, d=0–20; and
b+c+d≧1.
or R has the following phosphate structure:

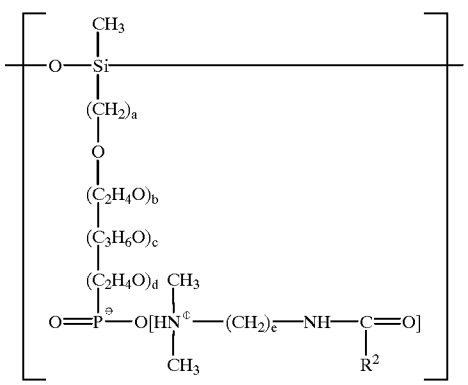

where $R^2$ is selected from aliphatic group, $C_8$–$C_{24}$, normal or branched, saturated or unsaturated;

a, e=1–4;

b, c, d=0–20; and b+c+d≧1.

As used herein, a "softener/debonder" is a chemical compound (which reduces tensile of the tissue products or modifies the surface of the tissue products, rendering a softer and/or smoother hand feel) selected from the group consisting of quaternary ammonium compounds, bis-imidazolinium compounds, di-quaternary ammonium compounds, polyammonium compounds, quaternized protein compounds, phospholipids, silicone debonders, silicone betaines, organoreactive polysiloxanes, and silicone glycols.

Suitable quaternary ammonium compounds have the following structures:

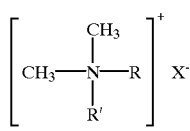

wherein

X=chloride, methyl sulfate, or other compatible counterion; and

R, R'=can be the same or different, are aliphatic, saturated or unsaturated $C_8$–$C_{24}$;

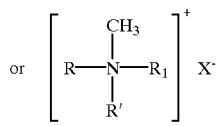

wherein

X=chloride, methyl sulfate, or other compatible counterion;

R, R' can be the same or different, are aliphatic, saturated or unsaturated $C_8$–$C_{24}$; and $R_1$=benzyl or epoxy group;

or

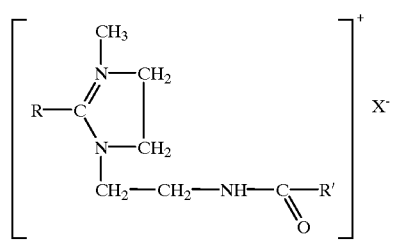

wherein

X=chloride, methyl sulfate, or other compatible counterion; and

R, R'=can be the same or different, are aliphatic, saturated or unsaturated $C_8$–$C_{24}$;

or

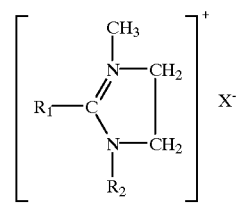

wherein

X=chloride, methyl sulfate or other compatible counterion;

$R_1$=aliphatic, saturated or unsaturated, branched or normal, $C_8$–$C_{24}$;

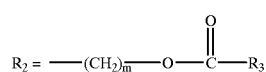

m=1–6; and $R_3$=aliphatic, saturated or unsaturated, branched, or normal, $C_8$–$C_{24}$;

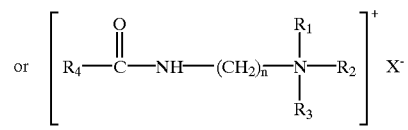

wherein $R_1$=hydrogen or $C_1$–$C_4$ alkyl;

$R_2$, $R_3$ can be the same or different, are $C_1$–$C_6$ alkyl, hydroxyalkyl; or

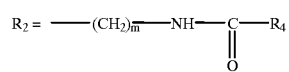

m=2–6;

n=2–6;

$R_4$=aliphatic, saturated or unsaturated, $C_8$–$C_{24}$; and

X=methyl sulfate, chloride, or other compatible counterion.

or

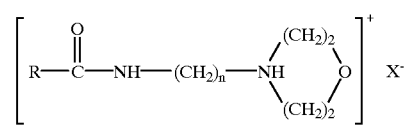

wherein

R=aliphatic $C_{12}$–$C_{24}$, saturated or unsaturated;

n=2–6; and

X=halide, methyl sulfate, ethyl sulfate or other compatible counterion;

or

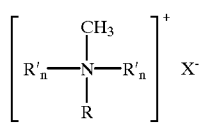

wherein
R=aliphatic, normal or branched, saturated or unsaturated, $C_8$–$C_{24}$;
X=chloride, methyl sulfate, ethyl sulfate, or other compatible counterion;
R'=2-hydroxyethyl or polyethoxyethanol; and
n=1 to 50;

or

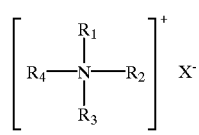

wherein
$R_1$, $R_2$, $R_3$ are $C_1$–$C_6$ alkyl or hydroxyalkyl, can be the same or different;

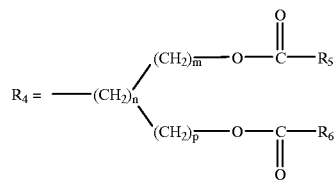

n=2–6;
m=0–6;
p=1–6;
$R_5$ and $R_6$ are $C_8$–$C_{24}$ aliphatic, normal or branched, saturated or unsaturated, (same or different); and
X=halide, methylsulfate, ethylsulfate or other compatible counterions.

or

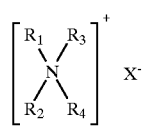

wherein $R_1$ and $R_2$ are $C_1$–$C_6$ alkyl or hydroxyalkyl (can be the same or different);

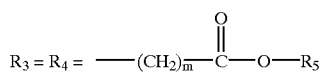

m=1–6;
$R_5$=aliphatic, saturated or unsaturated, normal or branched $C_8$–$C_{24}$; and
X=halide, methylsulfate, ethylsulfate or other compatible counterions;

or

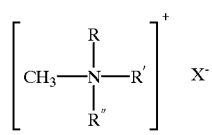

wherein
R, R', R" can be the same or different, are aliphatic alkyl, normal or branched, saturated or unsaturated, $C_8$–$C_{24}$; and
X=chloride, methyl sulfate or other compatible counterion;

or 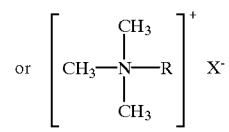

wherein
R=aliphatic, saturated or unsaturated, $C_8$–$C_{24}$; or allyl-, or R'—O—$(CH_2)_m$—
R'=normal or branched, $C_4$–$C_{18}$;
m=1–4; and
X=chloride, sulfate or any other compatible counterion.
Suitable silicone betaines include the following structure:

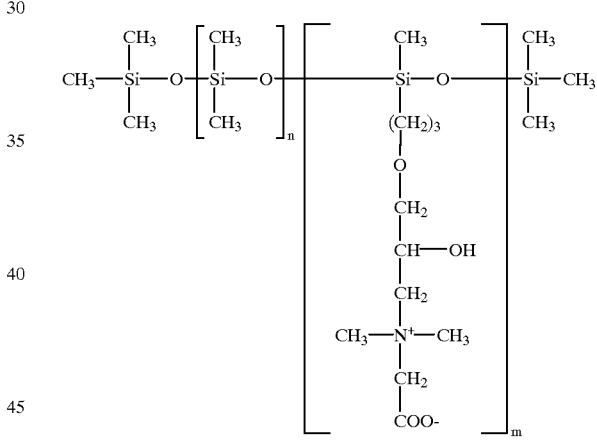

wherein
m=1–100; and
n=1–1000.
Suitable quaternized protein compounds include the following structures:

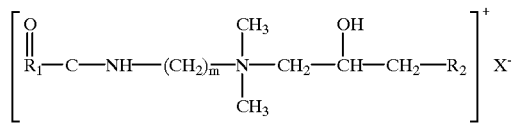

wherein
m=1–6;
$R_1$=fatty acid radical, saturated or unsaturated, branched or unbranched $C_{12}$–$C_{24}$;
$R_2$=hydrolyzed soy protein, hydrolyzed silk protein, collagen, keratin moiety or hydrolyzed wheat protein; and X=chloride, lactate or other compatible counterion;
or

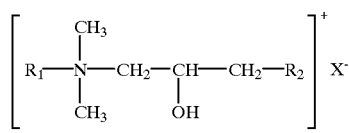

wherein $R_1$=fatty acid radical, saturated or unsaturated, $C_{12}$–$C_{24}$;

$R_2$=hydrolyzed collagen or keratin moiety; and

X=chloride, lactate or other compatible counterion.

Suitable phospholipids include, without limitation, those having the following structures:

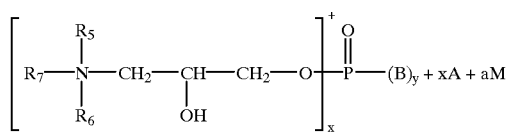

wherein x=1 to 3;

x+y=3;

a=0 to 2;

B=O⁻ or OM;

A=an anion;

M=a cation; and

R, $R_1$ & $R_2$ can be the same or different, are alkyl, substituted alkyl, alkylaryl or alkenyl groups of up to 16 carbon atoms and the total carbon atoms of R+$R_1$+$R_2$=10 to 24;

or

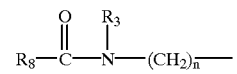

wherein x=1 to 3;

x+y=3;

a=0 to 2;

B=O⁻ or OM;

A=an anion;

M=a cation;

$R_5$, $R_6$ may be the same or different, are alkyl, hydroxyalkyl, carboxyalkyl of up to $C_6$, or polyoxyalkylene of up to $C_{10}$; or $R_5$, $R_6$ and the nitrogen they are attached to may represent an N-heterocycle;

$R_7$=an amidoamine moiety of the formula:

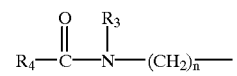

where n=2 to 6;

$R_3$=hydrogen or alkyl, hydroxyalkyl or alkenyl of up to 6 carbons; or cycloalkyl of up to 6 carbon atoms, or polyoxyalkylene of up to 10 carbon atoms; and $R_4$=alkyl, alkenyl, alkoxy or hydroxyalkyl, $C_5$–$C_{21}$, or aryl or alkaryl of up to $C_{20}$;

or

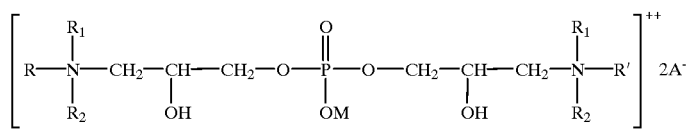

wherein

A=an anion;

M=a cation;

R, $R_1$ & $R_2$ can be the same or different, are alkyl, substituted alkyl, alkyl aryl or altkenyl groups of up to 16 carbon atoms, and the total carbon atoms of R+$R_1$+$R_2$=10 to 24; and R' is an amidoamine moiety of the structure:

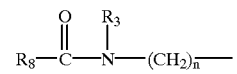

where n=2 to 6;

$R_3$=hydrogen or alkyl, hydroxyalkyl or alkenyl of up to 6 carbons; or cycloalkyl of up to 6 carbon atoms, or polyoxyalkylene of up to 10 carbon atoms; and $R_8$ has the following structure:

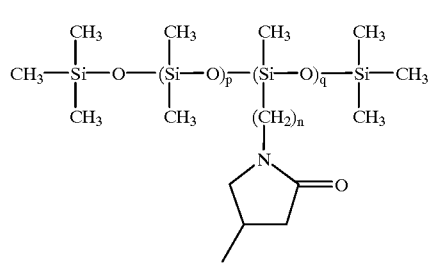

where n=3 or greater;

p=1 to 1000;

q=1 to 25.

Suitable silicone debonders include the following structure:

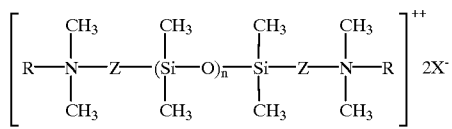

wherein

R=alkyl group, $C_{12}-C_{24}$;

z= —$CH_2$—$CH_2$—$CH_2$—O—$(CH_2)_3$—;

X=alkoxy, chloride or other compatible counterion; and n=1 to 50.

Suitable organoreactive polysiloxanes include the following structures:

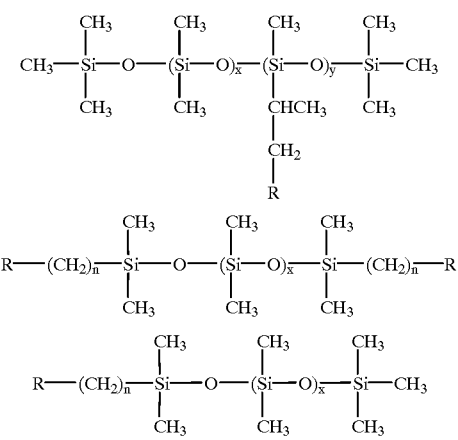

wherein

R=amine, carboxy, hydroxy, or epoxy;

n=3 or greater;

x=1 to 1000; and y=1 to 25.

Suitable silicone glycols include the following structure:

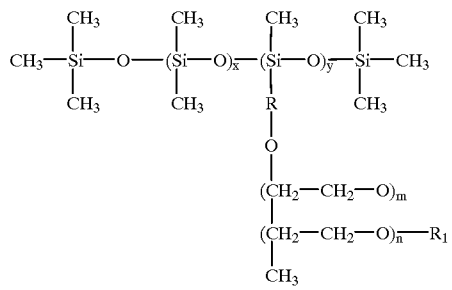

wherein

R=alkyl group, $C_1-C_6$;

$R_1$=acetate or hydroxy group;

x=1 to 1000;

y=1 to 50;

m=1 to 30; and n=1 to 30.

Suitable bis-imidazolinium compounds include the following structure:

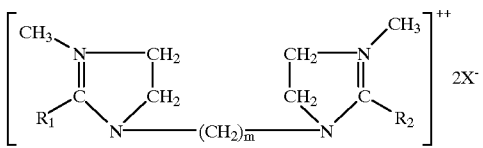

wherein

X=halide, methylsulfate, ethylsulfate or other compatible counterions;

m=2–8; and $R_1$, $R_2$ may be the same or different, are aliphatic, $C_{12}-C_{24}$, normal or branched, saturated or unsaturated.

Suitable diquaternary ammonium compounds include the following structures:

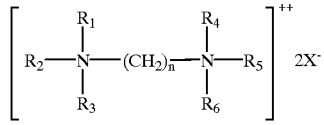

wherein

X=halide, methylsulfate, ethylsulfate or other compatible counterion;

n=2–8;

$R_1$, $R_4$ may be the same or different, are H, $CH_3$, or $(CH_2)_m OH$;

m=1–4;

$R_2$, $R_3$, $R_5$, $R_6$ may be the same or different, are from the following groups:

$(CH_2)_p OH$, where p=1–6;

or

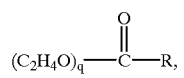

where q=1–10, R=aliphatic, $C_{12}-C_{24}$, saturated or unsaturated, normal or branched;

or

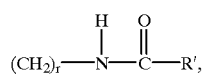

where r=1–10, R'=aliphatic, $C_{12}-C_{24}$, saturated or unsaturated, normal or branched;

or

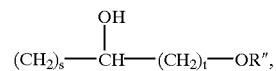

where s=1–10, t=1–4, R"=aliphatic, $C_{12}-C_{24}$, saturated or unsaturated, normal or branched.

Suitable poly ammonium compounds include the following structures:

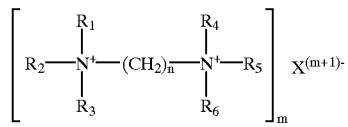

wherein n=2–6;

m≧1;

X=halide, methyl sulfate, ethyl sulfate or other compatible counterion;

$R_1$, $R_4$, $R_3$, $R_6$ may be the same or different, are H, $CH_3$, or $(CH_2)_p$ OH where p=2–6, or aliphatic, $C_{12}$–$C_{24}$, normal or branched, saturated or unsaturated;

$R_2$, $R_3$ may be the same or different, are aliphatic, $C_{12}$–$C_{24}$, normal or branched, saturated or unsaturated, or $(CH_2)_q$—CHOH—R' where R'=$C_{12}$–$C_{24}$, normal or branched, saturated or unsaturated, and q=1–6; or $(CH_2)_r$—O—R" where r=1–6, R"=$C_{12}$–$C_{24}$, normal or branched, saturated or unsaturated.

When a combination of a silicone amidoamine ester or phosphate and a softener/debonder is desired, the combination can be added to the thick stock simultaneously or separately. The combinations can contain one or more compounds from the above groups added to the slurry, either in a premixed form or individually metered.

The final tissue sheet comprises from about 0.01 to about 10 percent (by weight of the fiber) of the silicone amidoamine ester or phosphate either added to the wet end of the tissue making process or topically applied to the web, individually or in combination with other silicone amidoamine esters or phosphates or other softener/debonders. More preferably, the final tissue sheet comprises from about 0.1 to about 3 percent of the silicone amidoamine ester or phosphate added at the wet end, based on the weight of the fiber.

Silicone amidoamine esters or phosphates and softener/debonders used for topical treatment can be delivered in an aqueous solution or can be dissolved in a suitable solvent such as propylene glycol, hexylene glycol, ethylene glycol, polyethylene glycol, isopropyl alcohol, methanol, ethanol or other organic solvents. They can be applied to the surface of the basesheet individually or in combination with others. It is preferred that the composition for topical treatment comprises from about 1 to about 100 weight percent of the silicone amidoamine ester or phosphate and/or softener/debonder (individually or in combination), more preferably from about 35 to about 80 weight percent. It is also preferred that the silicone amidoamine ester or phosphate and/or the softener/debonder be topically added to the tissue sheet at an add-on ratio of from about 0.01 to about 10 weight percent of the fiber, and more preferably from about 0.1 to about 3 weight percent of the fiber.

Suitable methods for the topical treatment include, but are not limited to, spraying, rotogravure printing, trailing blade coating, flexographic printing, and the like.

EXAMPLES

Example 1

A 1-ply, blended, uncreped, through-air-dried basesheet was made. The furnish contained 50 weight percent of bleached eucalyptus hardwood kraft pulp and 50 weight percent of bleached northern softwood kraft pulp. The thick stock was diluted to approximately 0.1 percent consistency prior to forming, dewatering and drying of the tissue web. Fan pump was set at about 21 psi, while wet draw was set at about −25%. The total basis weight of the sheet was 16 lb per 2880 square feet with a target MD stretch of 20%.

Pecosil CA-1240 (a silicone coco-amidoamine ester wherein a=e=3, b+d≧5, c=0, Y=chloride, and $R^2$=coconut fatty moiety; Phoenix Chemical, Inc.) was added to the thick stock at 2, 4 and 6 (0.2, 0.4 and 0.6 weight percent) kilograms of active ingredient per metric ton of fiber. In all cases the resulting tissue product was softer than the untreated control with improved surface smoothness.

Example 2

Silquat AD (a silicone dilinoleoyl-amidoamine ester wherein a=e=3, b=8, c=d=0, Y=chloride, and $R^2$=dilinoleoyl moiety; Phoenix Chemical, Inc.) was added to the thick stock with the same furnish as Example 1 at the same levels. The resulting tissue product was softer than the untreated control with improved surface smoothness.

Example 3

Silquat AM (a cationic silicone myristyl-amidoamine ester wherein a=e=3, b=8, c=d=0, x=1, Y=chloride, and $R^2$=$C_{13}H_{27}$; Phoenix Chemical, Inc.) was added to the thick stock (with the same furnish as in Example 1) at the same levels. The resulting tissue product was softer than the untreated control with improved surface smoothness.

Example 4

Pecosil 14PS (a silicone myristyl-amidoamine phosphate wherein a=e=3, b=7, c=d=0, and, $R^2$=$C_{13}H_{27}$; Phoenix Chemical, Inc.) was added to the thick stock with the same furnish as in Example 1 at the same levels. The resulting tissue product was softer than the untreated control with improved surface smoothness.

Example 5

Pecosil SWQ-40 (structure shown below, a quaternized silicone wheat protein sharing similar silicone backbone as examples 1–3 but containing no amidoamine moiety, Phoenix Chemical, Inc.) was added to the thick stock with the same furnish as in Example 1 at the same levels. The resulting tissue product showed no tensile reduction at the same addition levels and did not have improved surface smoothness.

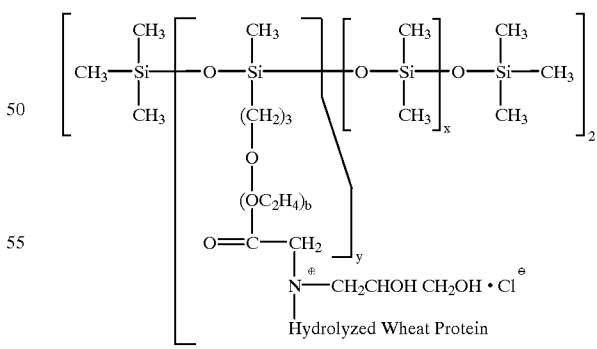

Example 6

Pecosil SM-40 (structure shown below, a myristyl-silicone quaternary sharing similar silicone backbone structure as examples 1–3 but containing no amidoamine moiety, Phoenix Chemical, Inc.) was added to the thick stock with the same furnish as in Example 1 at the same levels. No tensile reduction or softness improvement could be observed.

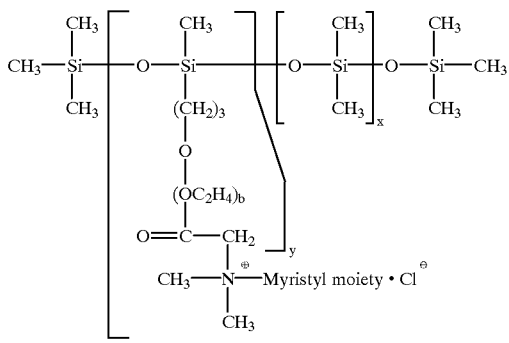

Example 7

Dow Corning 2-8919(a cationic silicone emulsion sharing similar silicone backbone as examples 1–3 but with no alkoxylation, no ester functionality or amidoamine moiety, Dow Corning) was added to the thick stock with the same furnish as in Example 1 at the same levels. No tensile reduction or softness improvement was observed.

Example 8

To further determine the softening/debonding effect of general cationic silicones, another cationic organoreactive polydimethylsiloxane microemulsion (Dow Corning 2-8676) was used in a 2-ply layered basesheet with the following furnish:

| Layer | Furnish | Dryer Basis Weight | PAE Wet Strength |
|---|---|---|---|
| F | Bleached softwood Kraft | 1.44 lb/2880 ft² | 2.1 lb/MT |
| E | Bleached softwood Kraft | 1.44 lb/2880 ft² | 2.1 lb/MT |
| D | Bleached eucalyptus Kraft | 4.32 lb/2880 ft² | 1.0 lb/MT |

Dow Corning 2-8676 emulsion diluted with water to a mixture containing 10 weight percent of Dow Corning 2-8676 and added at the thick stock of the conventional wet press tissue machine. The pH was controlled to between 5–6 to maintain the cationic nature of the silicone and to ensure better bonding with the fiber. The resulting tissue contained from 2 to 4 lb/MT of the active Dow Corning 2-8676 silicone. No tensile reduction nor surface feel improvement was observed.

This example clearly showed that the specified silicone—ester (or phosphate)—cationic amidoamine structure is essential to gain softness improvement. Other structurally similar silicones failed to produce softening effect.

Example 9

A 2-ply, wet-pressed, creped tissue was made using a layered headbox. The first stock layer (the layer which ultimately contacts the Yankee dryer surface) contained eucalpytus hardwood fiber and provided about 60 dry weight percent of the tissue sheet. The remaining 40 percent of the tissue sheet was provided via a second stock layer consisting of northern softwood kraft pulp. The total basis weight of the sheet was about 7.3 pounds per 2880 square feet of air dried tissue. Two strength agents were added to the fiber stock layers prior to the headbox. Parez 631 NC (a glyoxalated polyacrylamide from Cytec Industries, Inc.) was metered into the softwood thick stock at 0.08 to 0.1 percent of the total fiber weight. Another strength agent, Kymene 557 LX (commercially available from Hercules, Inc.) was metered into both the hardwood and the softwood thick stock at 0.05 and 0.1 percent of the total fiber weight respectively.

After drying and creping, the tissue sheet was plied together with a like sheet to form a two-ply, crimped tissue so that the eucalyptus fibers faced the outside. Silquat AC (a cationic silicone coco-amidoamine ester wherein a=e=3, b+d≧5, c=0, and $R^2$ is derived from coconut oil ranging from $C_8$ to $C_{18}$; Phoenix Chemical, Inc. 40% active) was rotogravure-printed onto both plies of the hardwood layer at an add-on amount of approximately 1 percent per ply based on the weight of fiber. The resulting tissue product had improved surface smoothness.

It will be appreciated that the foregoing examples, given for purposes of illustration, are not to be construed as limiting the scope of this invention, which is defined by the following claims and all equivalents thereto.

We claim:

1. A soft tissue comprising from about 0.01 to about 10 weight percent, based on fiber, of a compound selected from the group consisting of a cationic silicone amidoamine ester and a cationic silicone amidoamine phosphate.

2. The tissue of claim 1 wherein the amount of the selected compound is from about 0.1 to about 3 weight percent.

3. The tissue of claim 1 wherein the selected compound is a cationic silicone amidoamine ester having the following structure:

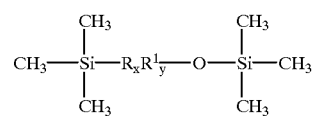

wherein x=1–1000;

y=0–1000;

$R^1$ has the following structure:

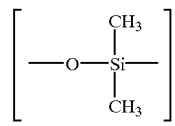

and R has the following ester structure:

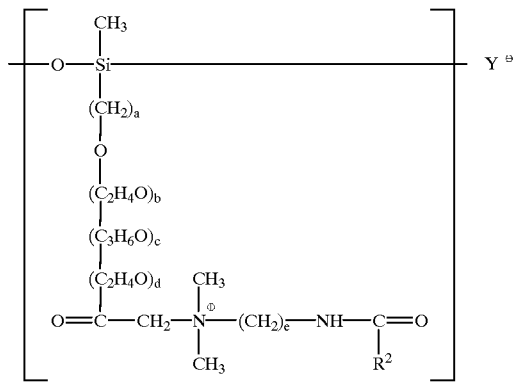

where

Y=halide, methyl sulfate, ethyl sulfate or other compatible counterion;

$R^2$ is selected from aliphatic group, $C_8$–$C_{24}$, normal or branched, saturated or unsaturated;

a, e=1–4;

b, c, d=0–20; and b+c+d≧1.

4. The tissue of claim 1 wherein the selected compound is a cationic silicone amidoamine phosphate having the following structure:

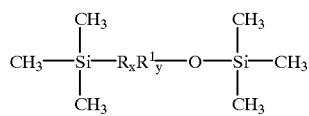

wherein x=1–1000;

y=0–1000;

$R^1$ has the following structure:

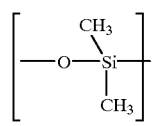

and R has the following phosphate structure:

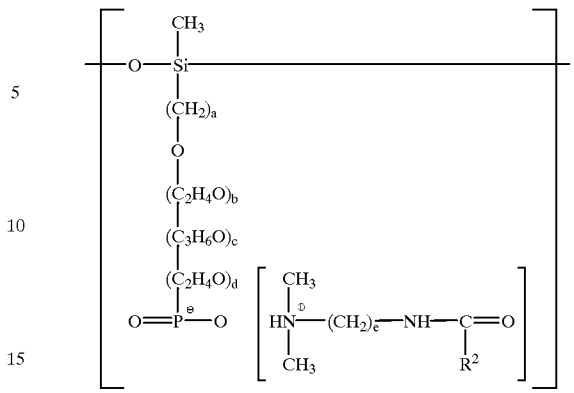

where $R^2$ is selected from aliphatic group, $C_8$–$C_{24}$, normal or branched, saturated or unsaturated;

a, e=1–4;

b, c, d=0–20; and b+c+d≧1.

5. The tissue of claim 1 further comprising a softener/debonder selected from the group consisting of quaternary ammonium compounds, bis-imidazolinium compounds, di-quaternary ammonium compounds, polyammonium compounds, phospholipids, silicone debonders, silicone betaines, organoreactive polysiloxanes and silicone glycols.

6. The tissue of claim 5 wherein the amount of the softener/debonder is from about 0.01 to about 10 weight percent, based on fiber.

7. A method for making a soft tissue comprising:
(a) forming an aqueous suspension of papermaking fibers and from about 0.01 to about 10 weight percent, based on fiber, of a compound selected from the group consisting of a cationic silicone amidoamine ester and a cationic silicone amidoamine phosphate;
(b) forming a tissue web by depositing the aqueous suspension of papermaking fibers onto a forming fabric; and
(c) dewatering and drying the tissue web.

8. The method of claim 7 comprising topically applying to the tissue web from about 0.01 to about 10 weight percent, based on fiber, of a compound selected from the group consisting of a cationic silicone amidoamine ester and a cationic silicone amidoamine phosphate.

9. The method of claim 7 or 8 wherein from about 0.01 to about 10 weight percent, based on fiber, of a softener/debonder is included in the aqueous suspension of papermaking fiber.

10. The method of claim 7 or 8 wherein from about 0.01 to about 10 weight percent, based on fiber, of a softener/debonder is topically applied to the tissue web.

11. A method for making a soft tissue comprising:
(a) forming an aqueous suspension of papermaking fibers;
(b) forming a tissue web by depositing the aqueous suspension of papermaking fibers onto a forming fabric;
(c) dewatering and drying the tissue web; and (d) topically applying to the tissue web from about 0.01 to about 10 weight percent, based on fiber, of a compound selected from the group consisting of a cationic silicone amidoamine ester and a cationic silicone amidoamine phosphate.

12. The method of claim 11 further comprising topically applying from about 0.01 to about 10 weight percent, based on fiber, of a softener/debonder to the tissue web.

13. The method of claim 11 further comprising including from about 0.01 to about 10 weight percent, based on fiber, of a softener/debonder in the aqueous suspension of papermaking fibers.

* * * * *